(12) United States Patent
Hironaka et al.

(10) Patent No.: US 6,203,240 B1
(45) Date of Patent: *Mar. 20, 2001

(54) COMPONENT RETAINING LEGS

(75) Inventors: Katsuhito Hironaka; Makoto Fukase, both of Okazaki (JP)

(73) Assignee: Daiwa Kogyo Kabushiki, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/356,708

(22) Filed: Jul. 28, 1999

Related U.S. Application Data

(63) Continuation of application No. 08/934,676, filed on Sep. 22, 1997, now Pat. No. 5,947,631, which is a continuation of application No. 08/619,793, filed on Mar. 20, 1996, now Pat. No. 5,669,731.

(30) Foreign Application Priority Data

Sep. 19, 1995 (JP) .................................................. 7-239989

(51) Int. Cl.[7] .................................................. F16B 19/00
(52) U.S. Cl. .......................... 403/397; 403/392; 411/508; 24/297
(58) Field of Search .................................. 403/397, 392, 403/384, 375, 105; 411/508, 509, 510, 913, 152; 24/458, 297, 453; 248/74.1, 74.3

(56) References Cited

U.S. PATENT DOCUMENTS

| | | | | |
|---|---|---|---|---|
| 2,424,757 | * | 7/1947 | Klumpp, Jr. ..................... | 411/510 X |
| 3,794,278 | * | 2/1974 | Frey, Jr. et al. .................. | 248/27.3 |
| 3,909,883 | * | 10/1975 | Fegen ............................... | 411/508 X |
| 3,988,808 | * | 11/1976 | Poe et al. ......................... | 24/326 |
| 3,991,446 | * | 11/1976 | Mooney et al. ................... | 411/548 |
| 4,431,355 | * | 2/1984 | Junemann ......................... | 411/508 X |
| 4,604,776 | * | 8/1986 | Takahashi ........................ | 24/453 |
| 4,644,614 | * | 2/1987 | Mizusawa ........................ | 24/453 |
| 4,787,795 | * | 11/1988 | Kraus .............................. | 411/510 |
| 4,795,116 | | 1/1989 | Kohut et al. . | |
| 4,981,310 | * | 1/1991 | Belisaire ......................... | 411/508 X |
| 5,111,557 | * | 5/1992 | Baum et al. ..................... | 24/297 X |
| 5,669,731 | * | 9/1997 | Hironaka et al. ................. | 403/397 |
| 5,947,631 | * | 9/1999 | Hironaka et al. ................. | 403/397 |

FOREIGN PATENT DOCUMENTS

| | | |
|---|---|---|
| 2181179 | 4/1987 | (GB) . |
| 1340995 | 12/1993 | (GB) . |
| 2289714 | 11/1995 | (GB) . |
| 49-64660 | 9/1947 | (JP) . |
| 57-166673 | 4/1956 | (JP) . |
| 5-96524 | 12/1983 | (JP) . |
| 60-28613 | 2/1985 | (JP) . |
| 60-44609 | 3/1985 | (JP) . |
| 1-71210 | 5/1989 | (JP) . |
| 1-113609 | 7/1989 | (JP) . |
| 2-097706 | 4/1990 | (JP) . |
| 5-44709 | 6/1993 | (JP) . |
| 5-223114 | 8/1993 | (JP) . |
| 5-34329 | 8/1993 | (JP) . |
| 5223114 | * 8/1993 | (JP) . |

\* cited by examiner

*Primary Examiner*—Harry C. Kim
(74) *Attorney, Agent, or Firm*—Dennison, Scheiner, Schultz & Wakeman

(57) ABSTRACT

A component retaining leg is disclosed, which comprises a base to be provided on a component such as a clamp and a clip, a pillar depending from the base, and a flexible retaining piece extending from the free end of the pillar in a folded fashion toward the base. The free end of the retaining piece has an engagement step section for engaging a mounting hole of a panel. The engagement step section has a plurality of engagement steps formed at a predetermined interval.

20 Claims, 17 Drawing Sheets

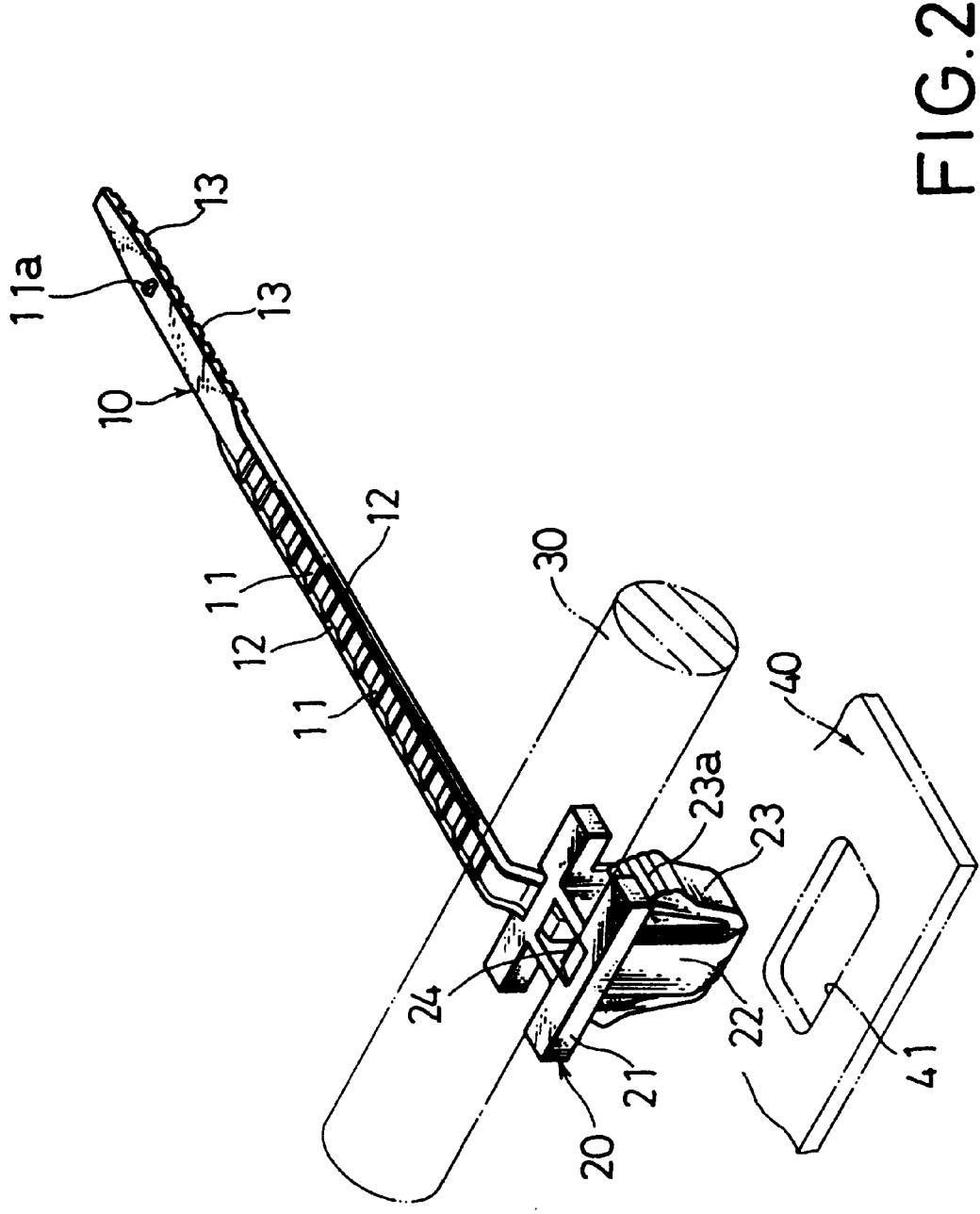

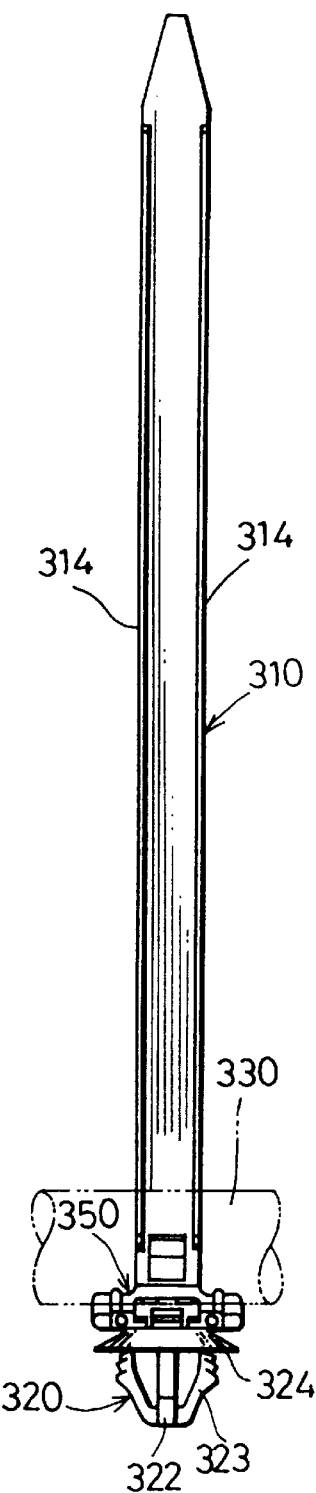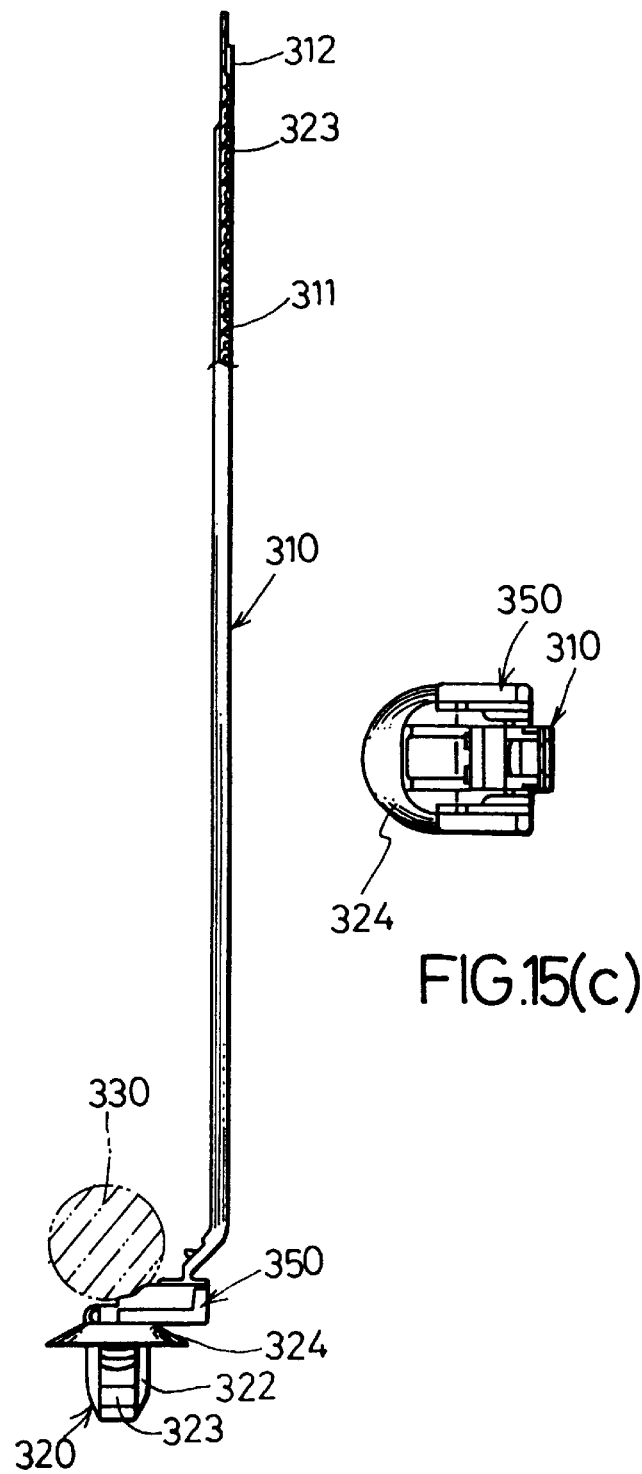
FIG.15(a)   FIG.15(b)   FIG.15(c)

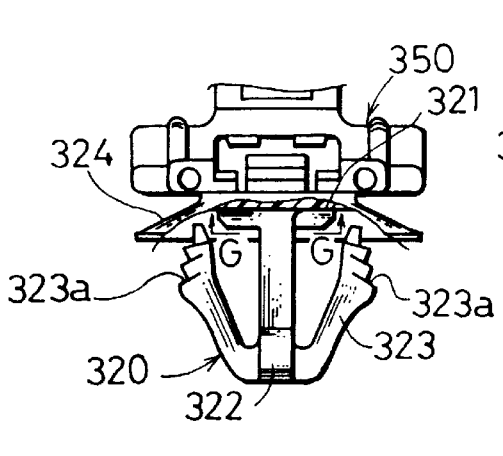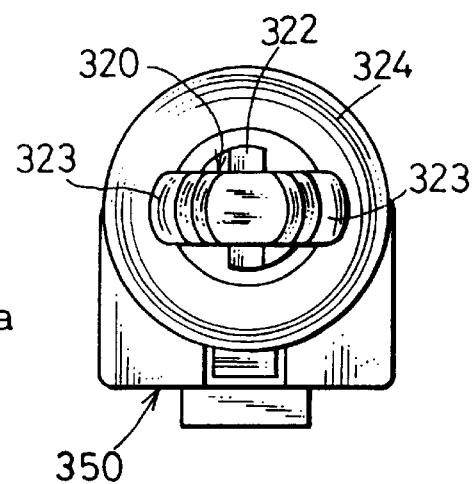
FIG.17(a)     FIG.17(b)
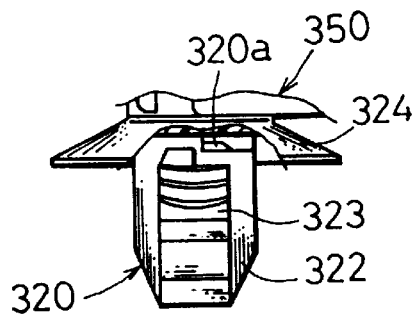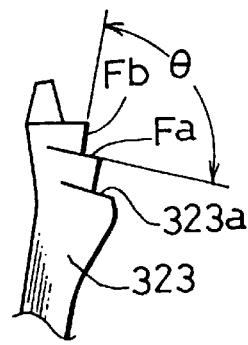
FIG.17(c)     FIG.17(d)
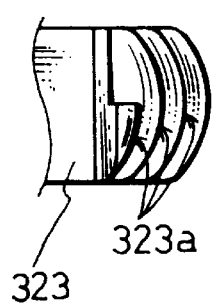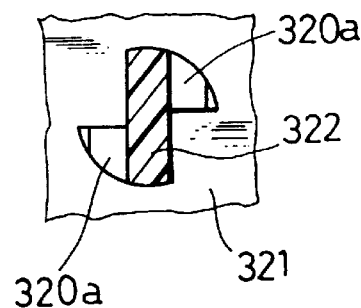
FIG.17(e)     FIG.17(f)

COMPONENT RETAINING LEGS

This application is a continuation of application Ser. No. 08/934,676, filed Sep. 22, 1997, now U.S. Pat. No. 5,947,631, which is a continuation of application Ser. No. 08/619,793, filed Mar. 20, 1996, now U.S. Pat. No. 5,669,731.

BACKGROUND OF THE INVENTION

1. Field of the Invention

This invention relates to component retaining legs for attaching clamps, clips or like components to panels such as automotive body panels.

2. Description of the Prior Art

An example of prior art component retaining leg is shown in the front view of FIG. 19. This retaining leg 80 is a molding of a synthetic resin, and comprises a base 81 to be provided on a clamp, a clip or like component, a pillar 82 depending from the base 81, and a pair of flexible retaining pieces 83 extending from the free end of the pillar 82 in a folded fashion toward the base 81. The retaining pieces 83 each have their free end formed with a single step or shoulder 83a to be engaged with the surface of a panel 84 adjacent a mounting hole 85 formed therein. As the retaining leg 80 is inserted through the mounting hole 85 of the panel 84, the retaining pieces 83 are caused by the mounting hole 85 to flex toward each other. When the retaining leg 80 is inserted until the base 81 engages the panel 84, the retaining pieces 83 are elastically restored so that the steps 83a are click engaged with the panel surface adjacent the mounting hole 85. Thus, the retaining leg 80 is attached, i.e., retained against detachment.

The prior art retaining leg 80 can be attached without rattling against a panel 84 which has a thickness t corresponding to, i.e., equal to, the distance between the base 81 and the step 83a. When the thickness t of the panel 84 is not fixed, however, the retaining leg 80 may be attached to the panel, such that the retaining leg 80 will rattle against the panel 84 or the retaining leg 80 can not be attached. To cope with variations of the thickness t of the panel 84, it is necessary to prepare a plurality of different retaining legs 80 each fitted to each panel thickness. In such case, time-consuming component management is required.

SUMMARY OF THE INVENTION

The invention seeks to solve the above problem, and it has an object of providing a component retaining leg which can be attached to panels having different thicknesses so that component management can be dispensed with.

The invention features a component retaining leg which comprises a base to be provided on a component such as a clamp and a clip, a pillar depending from the base, and a flexible retaining piece extending from the free end of the pillar in a folded fashion toward the base, the free end of the retaining piece having an engagement step section for engaging a mounting hole of a panel, the engagement step section having a plurality of engagement steps formed at a predetermined interval.

As the component retaining leg according to the invention is inserted through a mounting hole of a panel, the retaining pieces are caused by the mounting hole to flex toward each other, and when the base engages the panel, the retaining pieces are elastically restored so that their engagement step sections engage the mounting hole. Thus, the retaining leg is attached and retained against detachment.

Since each engagement step section has a plurality of engagement steps, it is possible to eliminate rattling or inability to attach the retaining leg irrespective of the panel thickness, and the retaining leg can be adequately attached to the panel.

BRIEF DESCRIPTION OF THE DRAWINGS

FIG. 2 is a perspective view showing a belt clamp with the retaining leg;

FIGS. 15(a) to 15(c) are views showing a belt clamp with a retaining leg of a fourth embodiment;

FIGS. 17(a) to 17(f) are views showing the retaining leg of the same belt clamp;

DETAILED DESCRIPTION OF THE PREFERRED EMBODIMENTS

Preferred embodiments of the invention will now be described.

First Embodiment A first embodiment will now be described with reference to FIGS. 1(a) to 7. The retaining leg of the first embodiment is applied to a belt clamp for an automotive wire harness.

Figure 3:
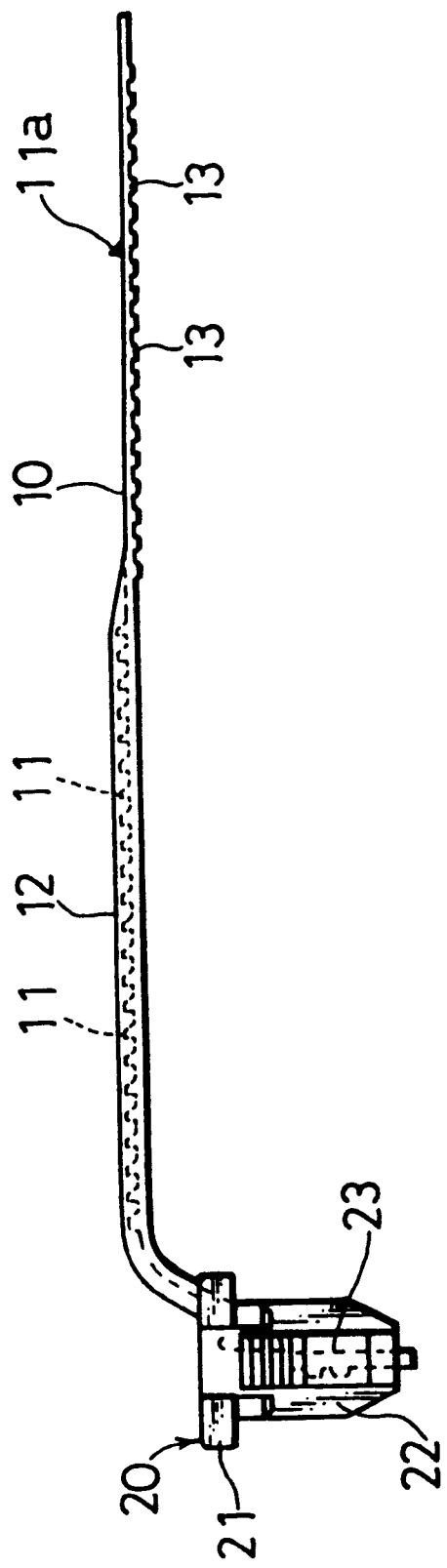
FIG. 3 is a side view showing the same belt clamp.
Figure 4:
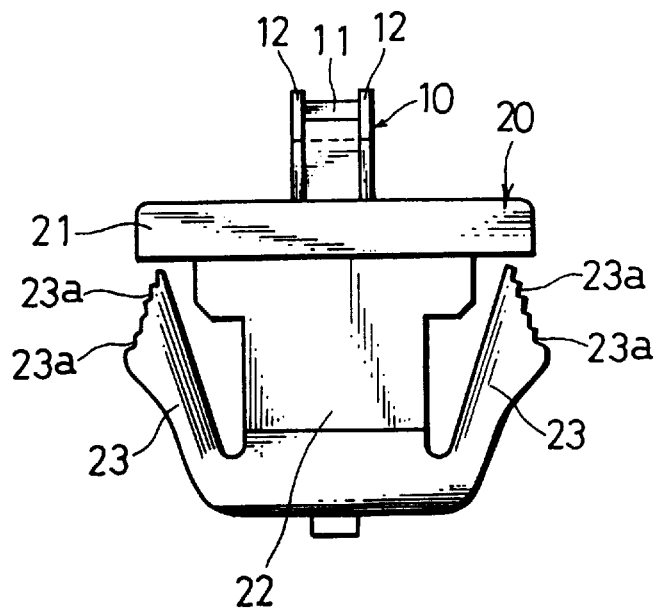
FIG. 4 is a front view showing the same belt clamp.

FIG. 2 is a perspective view showing the belt clamp, FIG. 3 is a side view showing the same, and FIG. 4 is a front view showing the same. As shown in these drawings, the belt clamp is a one-piece molding of a synthetic resin, and mainly comprises a flexible belt 10 and a retaining leg 20 joined to the belt 10 and serving as a buckle.

The inner surface (or upper surface) of the belt 10 on the winding side, has a plurality of engagement teeth 11 formed in a row at a predetermined interval In the longitudinal direction and also has ribs 12 formed along the opposite sides of the engagement teeth row. The winding side surface of an end portion of the belt 10 has a temporary engagement tooth 11a, and the opposite surface (or inner surface) of the same end portion has a plurality of anti-slip protuberances 13 formed in a row at a predetermined interval in the longitudinal direction. The retaining leg 20 to which a stem of the belt 10 is joined as shown in the front view of FIG. 1(a), can be substantially coaxially mounted in a mounting hole 41 of a panel 40, and it comprises a base 21, a pillar 22 depending therefrom, and a pair of flexible retaining pieces 23 extending from the free end of the leg 22 in a folded fashion toward the base 21.

The free end of each retaining piece 23 has an engagement step section 23a to be engaged with the mounting hole 41 of the panel 40. The engagement step section 23a has a plurality of (five in the drawing) steps, as shown in the enlarged-scale view of FIG. 1(b).

Figure 1A:
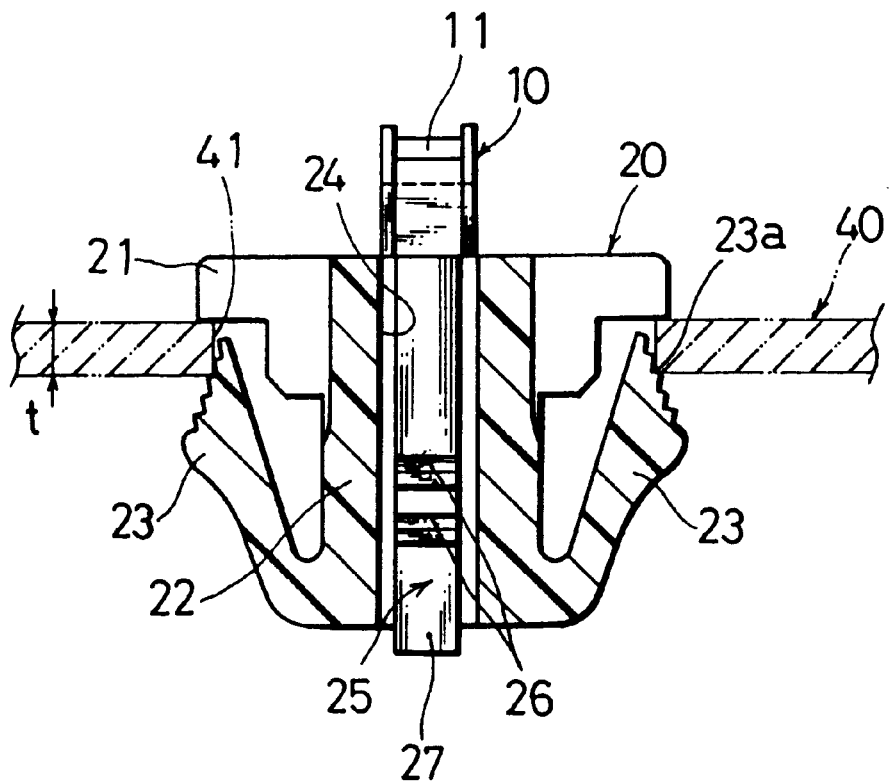
FIGS. 1(a) and 1(b) are views illustrating a retaining leg according to a first embodiment of the invention.
Figure 5:
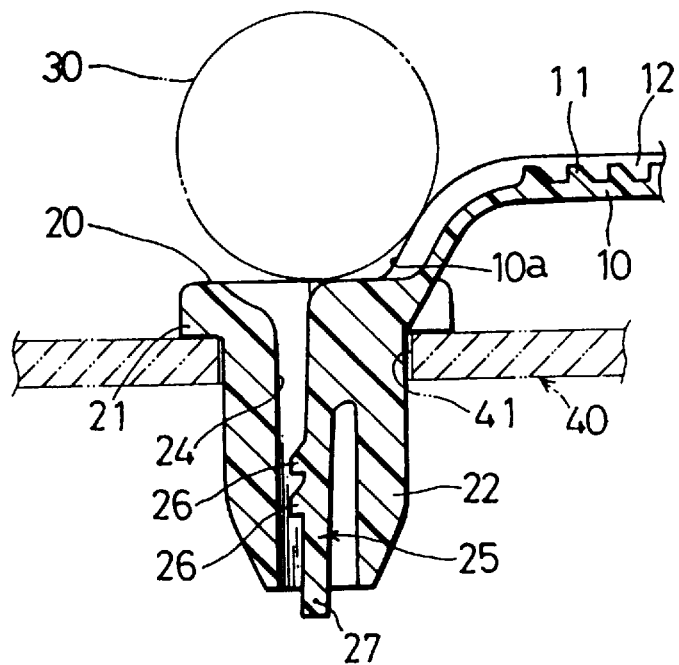
FIG. 5 is a sectional view showing the retaining leg of the same belt clamp.
Figure 6:
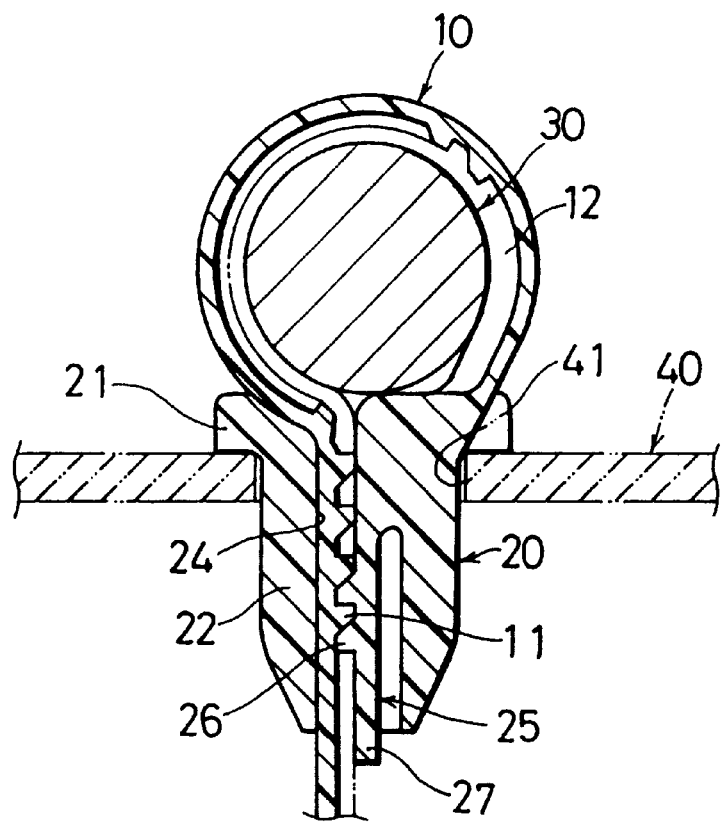
FIG. 6 is a sectional view showing the belt clamp in a state in which an object is bound.
Figure 7:
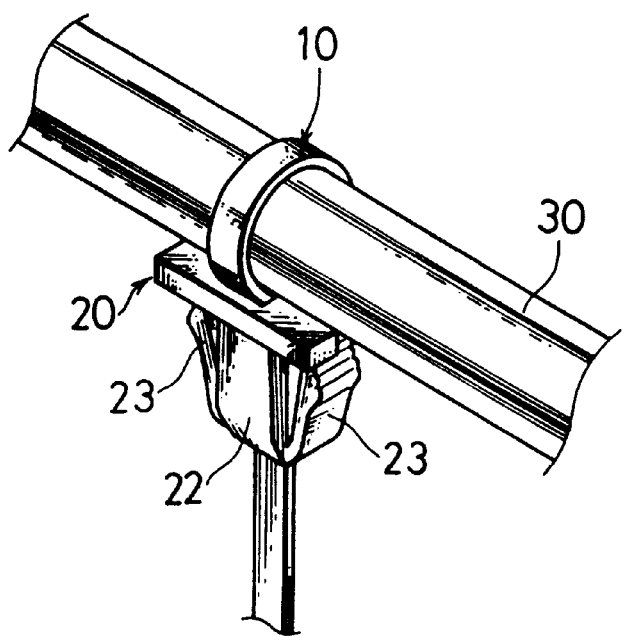
FIG. 7 is a perspective view showing the same belt clamp.

Referring to FIG. 5, i.e., a sectional view showing the retaining leg 20, in addition to FIG. 1(a), the pillar 22 of the retaining leg 20 has an axial through bore 24 through which the belt 10 is inserted from its leading end. The retaining leg 20 further comprises a flexible engagement piece 25 which extends downward from an upper end portion of the wall surface of the through hole 24 that is joined to the belt 10. The engagement piece 25 has two engagement protuberances 26 which can engage the engagement teeth 11 of the belt 10. With elastic deformation of the engagement piece 25, the engagement protuberances 26 permit passage of the engagement teeth 11 when tightening the belt 10, but they block passage of the teeth 11 in the reverse direction, i.e., they present the belt 10 from slipping in the reverse direction. The engagement piece 25 has an engagement release piece 27 formed at the free end thereof and projecting from the lower end of the pillar 22. The engagement release piece 27 can be operated to cause flexing of the engagement piece 25 so as to release the engagement between the engagement protuberances 26 and the engagement teeth 11.

A case of binding an object (for instance, a wire harness) with the above belt clamp will now be described. The base 21 of the retaining leg 20 is held in a position to bundle an object 30, as shown by broken lines in FIG. 5. Then, the belt 10 is wound on the object 30, and the leading end of the belt 10 is inserted through the through hole 24 so that it projects downward from the retaining leg 20. At this time, the temporary engagement tooth 11a of the belt 10 clears the engagement protuberances 26 as a result of elastic deformation of the engagement piece 25, so that the belt 10 is tied to the retaining leg 20 and retained against detachment.

Afterwards, the object 30 is tightly bound by pulling the end of the belt 10 that projects downward from the retaining leg 20 with fingers. As a result, the engagement teeth 11 of the belt 10 are caused to clear the engagement protuberances 26 as a result of elastic deformation of the engagement piece 25. At the end of the pulling, the engagement protuberances 26 are engaged with corresponding engagement teeth 11, so that the binding of the object 30 is completed. The resultant bound state of the object 30 is shown in a sectional view in FIG. 6 and in a perspective view in FIG. 7.

When tightly binding the object 30, all the anti-slip protuberances 13 provide a function of preventing finger slippage. When it becomes necessary to re-bind the object 30, the engagement of the engagement protuberances 26 with the engagement teeth 11 is released by operating the engagement release piece 27. By so doing, it is possible to loosen the belt 10 or take the belt 10 out through the through hole 24.

Thereafter, the retaining leg 20 is inserted through the mounting hole 41 of the panel 40. As the retaining leg 20 is inserted through the mounting hole 41, the retaining pieces 23 are caused to flex toward each other by the edge of the mounting hole 41. When the base 21 comes to engage the panel 40, the retaining pieces 23 are elastically restored thereby causing the appropriate step within engagement step section 23a that corresponds to the thickness t of the panel 40 to engage the mounting hole 41, so that the retaining leg 20 is attached and retained against detachment. With the retaining leg 20 attached in the mounting hole 41 in this way, the object 30 is bound and clamped to the panel 40.

Figure 1B:
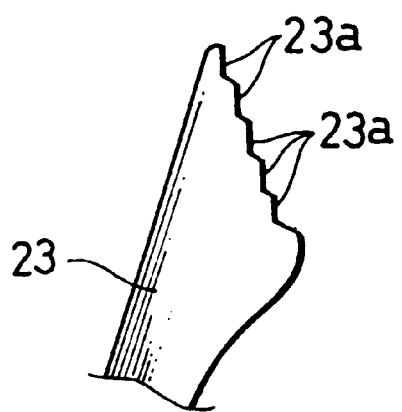

With the above retaining leg 20, since the free end of each retaining piece 23 includes an engagement step section 23a having a plurality of steps, as shown in FIGS. 1(a) and 1(b), a step corresponding to the thickness t of the panel 40 engages the mounting hole 41. That is, it is possible to eliminate rattling or disability of attachment of the retaining leg 20 irrespective of the panel thickness, and the retaining leg 20 can be adequately attached to the panel 40. A single kind of retaining leg 20 thus can be adequately attached to panels 40 having different thicknesses t, and time-consuming component management Is unnecessary.

Second Embodiment

A second embodiment will now be described with reference to FIGS. 8(a) to 10(b). The retaining leg of the second embodiment is applied to a clamp for an automotive wire harness.

Figure 8A:
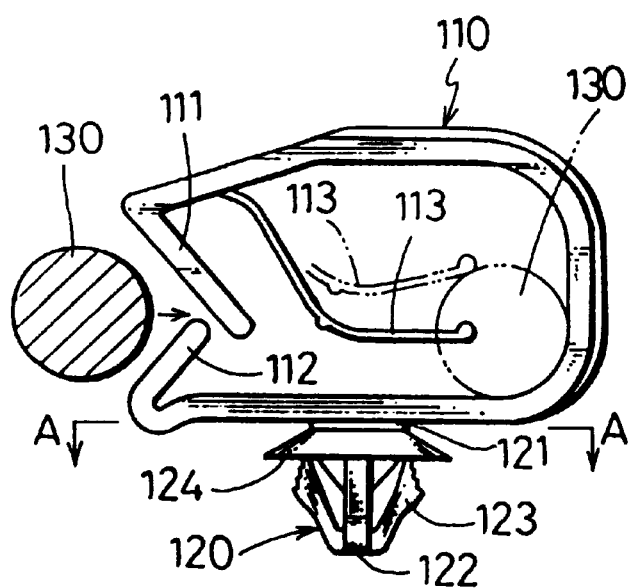
FIGS. 8(a) to 8(d) illustrate a clamp with a retaining leg of a second embodiment.
Figure 8B:
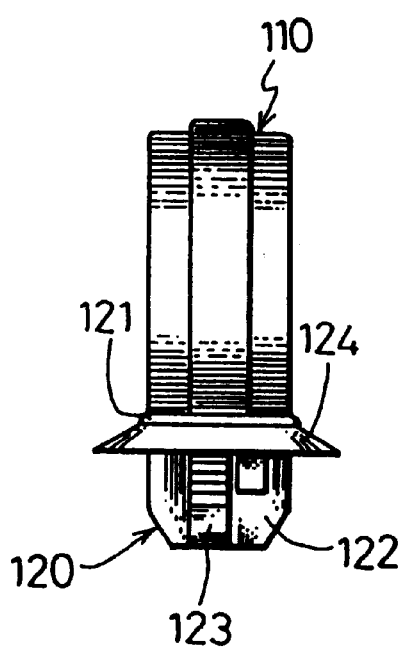
Figure 8C:
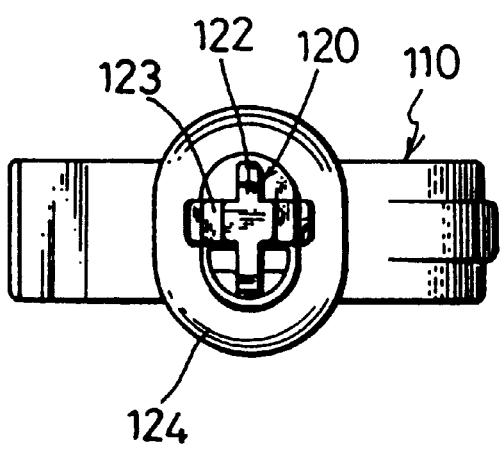
Figure 8D:
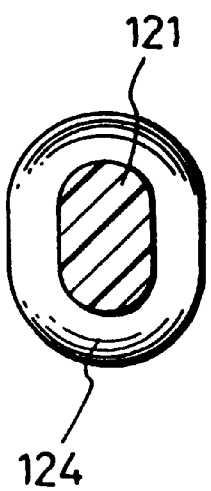

FIGS. 8(a) to 8(d) illustrate the clamp. FIG. 8(a) is a front view, FIG. 8(b) is a right side view, FIG. 8(c) is a bottom view, and FIG. 8(d) is a sectional view taken along line A—A in FIG. 8(a). As shown in FIGS. 8(a) to 8(c), the clamp is a one-piece molding of a synthetic resin, and it mainly comprises a substantially C-shaped flexible clamp portion 110, and a retaining leg 120 depending from the underside of the clamp portion 110.

The clamp portion 110 has upper and lower folded guide portions 111 and 112, and also has a pushing piece 113 extending downward from the upper end portion thereof.

Figure 9A:
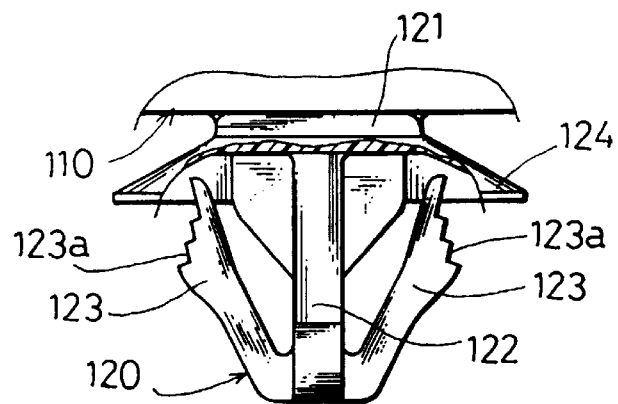
FIGS. 9(a) to 9(d) are views showing the same retaining leg.
Figures 9B, 9C:
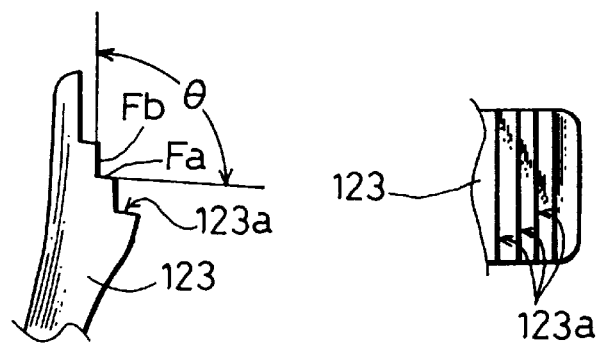
Figure 9D:
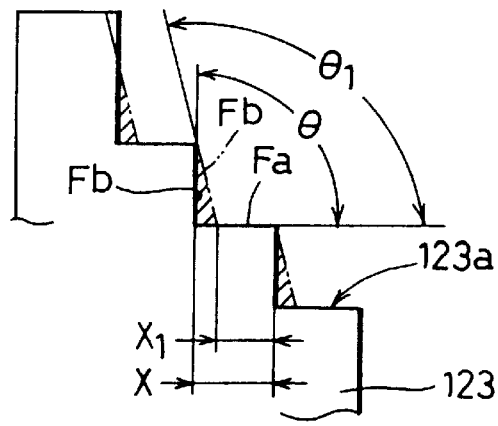

FIGS. 9(a) to 9(d) show the retaining leg 120 depending from the underside of the clamp portion 110. FIG. 9(a) is a partly broken-apart front view, FIG. 9(b) is an enlarged-scale view showing an engagement step section, FIG. 9(c) is a plan view showing the same, and FIG. 9(d) is a view for describing the engagement step section. As shown in FIG. 9(a), the retaining leg 120 comprises a base 121, a pillar 122 depending therefrom, and a pair of flexible retaining pieces 123 extending from the free end of the pillar 122 in a folded fashion toward the base 121. The base 121 is substantially oval in plan view, as shown in FIG. 8(d), and has a substantially dish-like stabilizer 124 formed on the bottom thereof, as shown in FIGS. 8(a) to 8(c).

Figure 10A:
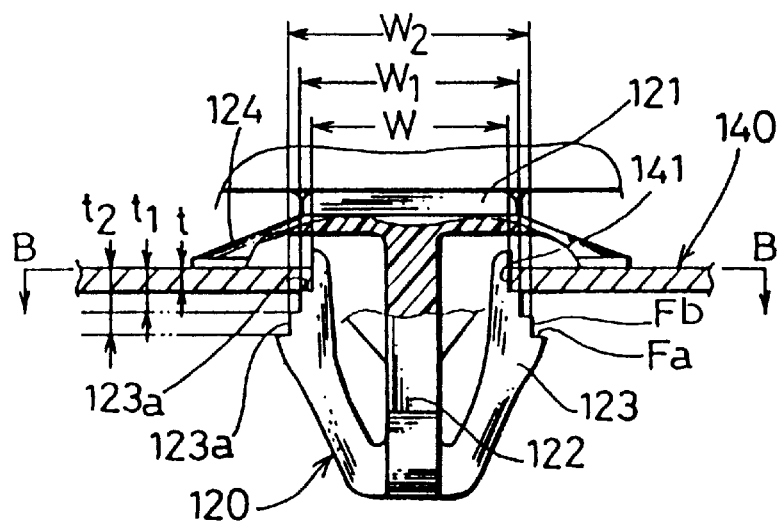
FIGS. 10(a) and 10(b) showing the same retaining leg in an attached state.
Figure 10B:
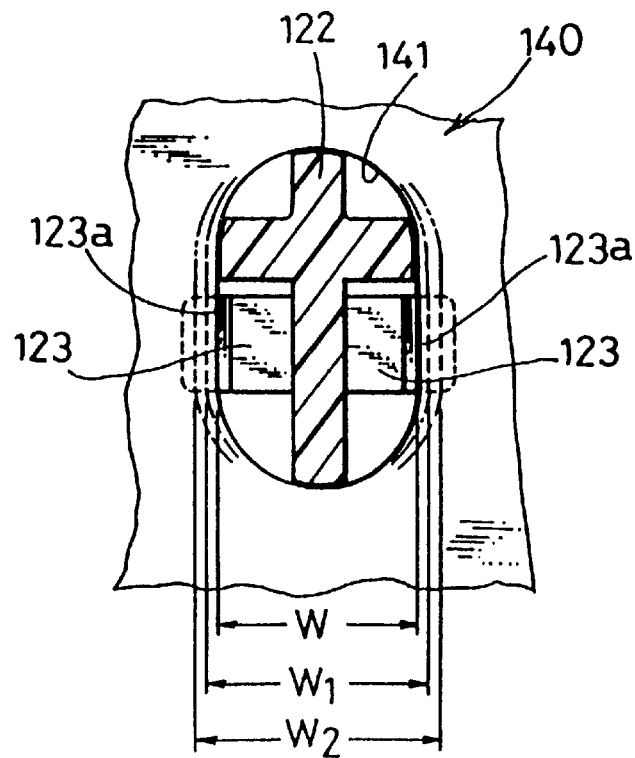

The free end of each of the retaining pieces 123 has an engagement step section 123a to engage the mounting hole 141 of a panel 140 which will be described later. As shown in FIGS. 9(b) and 9(c), each engagement step section 123a has a plurality of (three in the drawing) steps. The mounting hole 141 of the panel 140 is substantially oval, as shown in FIGS. 10(a) and 10(b) for describing the state of attachment of the retaining leg 120. FIG. 10(a) is a partly broken-away front view, and FIG. 10(b) is a sectional view taken along line B—B in FIG. 10(a).

Referring to FIGS. 10(a) and 10(b), in the second embodiment, the engagement step sections 123a engage straight portions of the mounting hole 141 of the panel 140 in the major diametrical direction of the mounting hole 141. The engagement step sections 123a are straight in the width direction of the retaining pieces 123.

As shown in FIG. 9(b), the angle θ between each step or engagement face Fa of the engagement step section 123a that substantially faces the outer surface of the panel 140 and the associated engagement face Fb that substantially faces the inner edge surface of the mounting hole 141 of the panel 140, is set substantially to 90° (97°, for instance, as shown in the drawing). Each engagement face Fa is formed in a plane substantially at right angles to the center line of the retaining piece 123, and the engagement faces Fb are substantially parallel to one another.

AS shown in FIGS. 10(a) and 10(b), the engagement faces Fa of each engagement step section 123a are formed such that, when the engagement step section is disposed within the mounting hole 141, the engagement face Fa that contacts the panel 140 will be parallel to the outer surface of the panel 140, regardless of whether the panel 140 has a thickness of t, $t_1$ or $t_2$ and regardless of whether the mounting hole 141 has a width W, $W_1$ or $W_2$.

A case of binding an object (for instance, a wire harness) with the above clamp will now be described. As shown in FIG. 8(a), the guide portions 111 and 112 are held in position to bundle an object 130, and the object 130 is then pushed into the clamp portion 110 by making use of the elasticity of the clamp portion 110 so that it is clamped by the elasticity of the pushing piece 113 as shown by broken lines in the drawing.

Then, as shown in FIGS. 10(a) and 10(b), the retaining leg 120 is inserted through the mounting hole 141 of the panel 140. As the retaining leg 120 Is inserted through the mounting hole 141, the retaining pieces 123 are caused to flex inwardly by the edge of the mounting hole 141. When the base 121 contacts the panel 140, the step in each engagement step section 123a corresponding to thickness t, $t_1$ or $t_2$ of the panel 140 engages the mounting hole 141 having width W, $W_1$ or $W_2$, so that the retaining leg 120 Is attached and retained against detachment. With the attachment of the retaining leg 120 in position in the mounting hole 141, the object 130 is bound and clamped to the panel 140. The stabilizer 124 is held in elastic contact with the surface of the panel 140.

Thus, the retaining leg 120 can be adequately attached to the panel 140 irrespective of the thickness thereof because the step in the engagement step section 123a that corresponds to the panel thickness t, $t_1$ or $t_2$ engages the mounting hole 141 having the width W, $W_1$ or $W_2$. That is, it is possible to eliminate rattling or the inability to attach the retaining leg 120. In addition, a single kind of retaining leg 120 can be adequately attached to a plurality of panels 140 having different thicknesses, and time-consuming component management is unnecessary.

As a further advantage, since with the retaining leg 120, the angle θ between the step or engagement face Fa of each engagement step section 123a and the associated engagement face Fb is set substantially to 90°, it is possible to provide an increased contact area of the engagement face Fa of the engagement step section 123a with respect to the panel 140. This will be described with reference to FIG. 9(d). When the angle $θ_1$ between the engagement faces Fa and Fb is set to 115° as shown by broken lines, i.e., with angle $θ_1$, the contact area of the engagement face Fa Is $X_1$. With angle θ, the contact area X of the engagement face Fa includes the shaded area and is thus greater than the contact area $X_1$. An increased retention force of the retaining leg 120 with respect to the panel 140 thus can be obtained. The angle θ is suitably 90° or around 90°, for instance in a range of 90° to 98°.

As a still further advantage of the retaining leg 120, when the engagement step sections 123a engage the mounting hole 141 of the panel 140 with thickness t, $t_1$ or $t_2$, the prevailing engagement face Fa of the engagement step section 123a is parallel to the back surface of the panel 140, and thus the engagement face Fa of the engagement step section 123a properly engages the panel 140.

The retaining leg 120 can be attached in position in mounting holes 141 having a fixed width for panels 140 having different thicknesses t, $t_1$ and $t_2$.

Third embodiment

A third embodiment will now be described with reference to FIGS. 11(a) to 14(d). The retaining leg of the third embodiment is again applied to a belt clamp for an automotive wire harness.

Figures 11A, 11B, 11C:
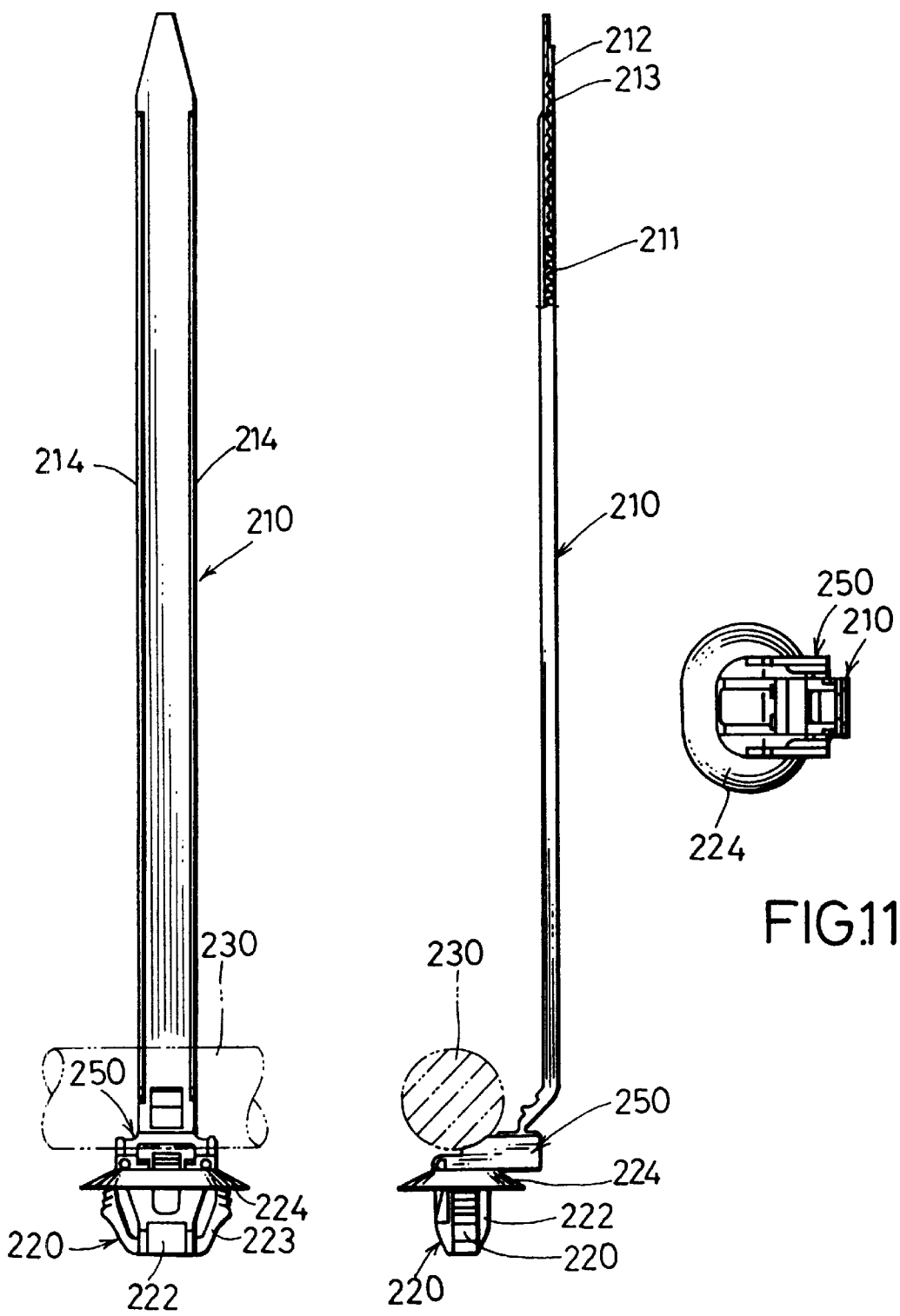
FIGS. 11(a) to 11(c) are views showing a belt clamp with a retaining leg of a third embodiment.
Figures 12A, 12B:
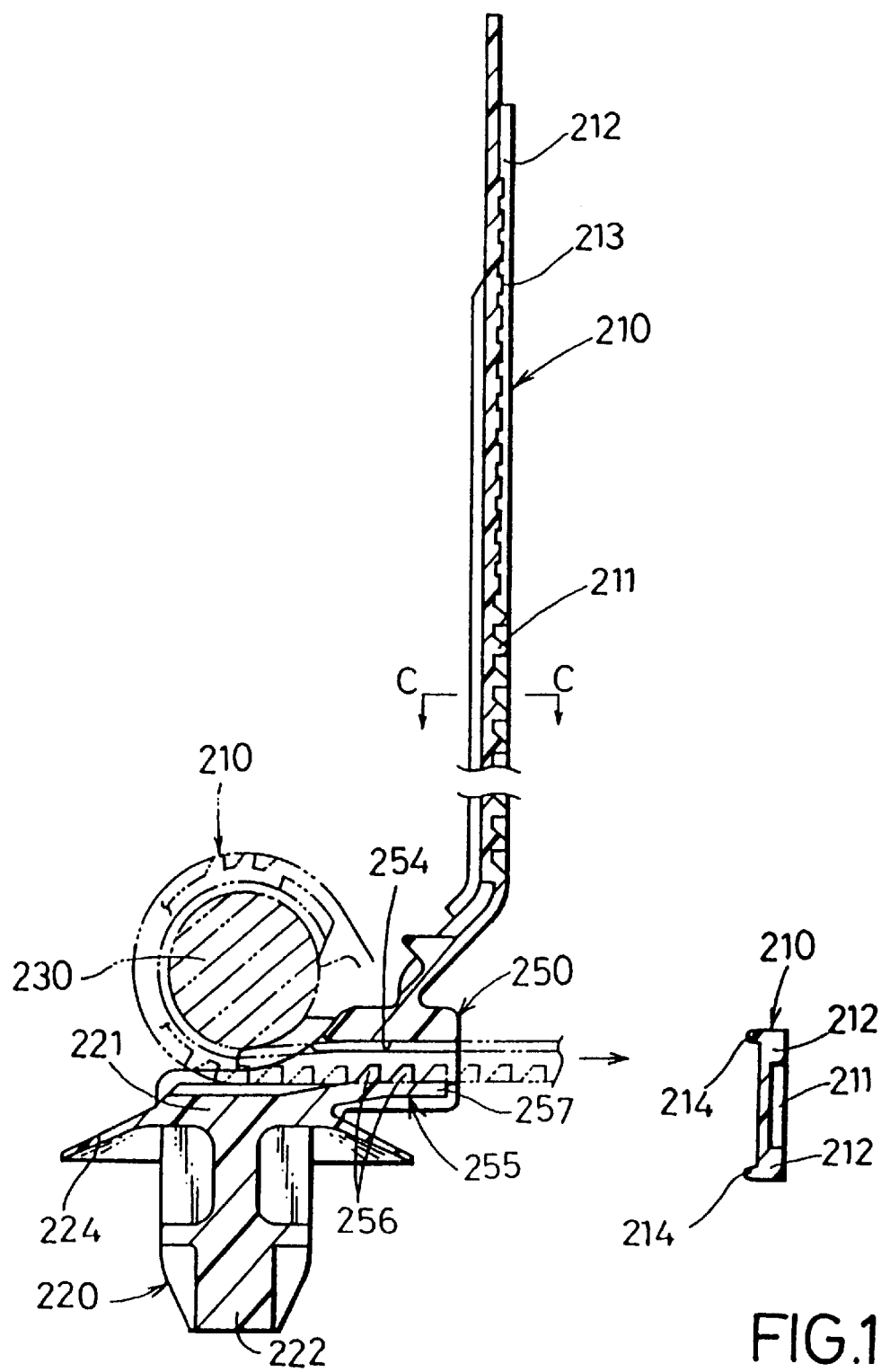
FIGS. 12(a) and 12(b) are sectional views showing the same belt clamp.

FIGS. 11(a) to 11(c) show the belt clamp. FIG. 11(a) is a front view, FIG. 11(b) is a partly broken-away right side view, and FIG. 11(c) is a plan view. FIG. 12(a) is a sectional view showing the belt clamp, and FIG. 12(b) is a sectional view taken along line C—C in FIG. 12(a).

As shown in FIGS. 11(a) to 12(b), the belt clamp is a one-piece molding of a synthetic resin, and it mainly comprises a flexible belt 210, a buckle 250 joined to the belt 210, and a retaining leg 220 joined to the buckle 250.

The outer surface (or back surface) of the belt 210 on the winding side, has a plurality of engagement teeth 211 formed in a row at a predetermined interval in the longitudinal direction and also has ribs 212 formed along the opposite sides of the engagement teeth row. The inner surface (i.e., front in the drawing) of the belt 210 on the winding side, has ribs 214 formed along the opposite edges. The outer surface of an end portion of the belt 210 has a plurality of anti-slip protuberances 213 formed in a row at a predetermined interval in the longitudinal direction.

The buckle 250 joined to the stem of the belt 210, as shown in FIG. 12(a), has a longitudinal through hole 254 through which the belt 210 is inserted. An engagement piece 255 extends rearward from a front portion of the lower wall surface of the through hole 254. The engagement piece 255 has two engagement protuberances 256 capable of engaging the engagement teeth 211 of the belt 210. With elastic deformation of the engagement piece 255, the engagement protuberances 256 permit passage of the engagement teeth 211 when tightening the belt 210, but they block passage of the engagement teeth 211 in the reverse direction. The engagement piece 255 has an engagement release piece 257 formed at the free end thereof. The engagement release piece 257 can be operated to cause flexing of the engagement piece 255 so as to release engagement of the engagement protuberances 256 and the engagement teeth 211.

Figure 13A:
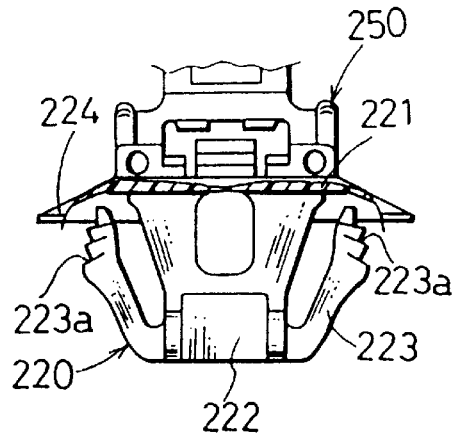
FIGS. 13(a) to 13(f) are views showing the retaining leg of the same belt clamp.
Figure 13B:
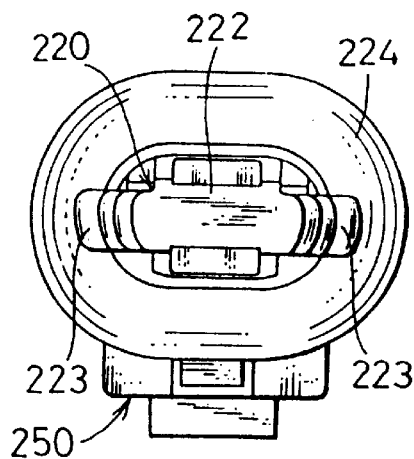
Figure 13C:
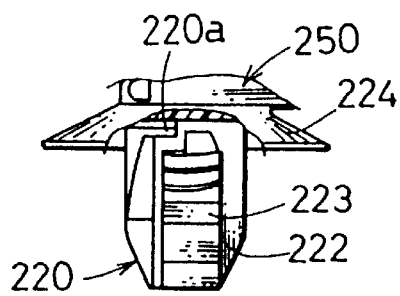
Figure 13D:
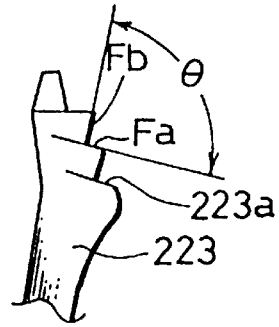
Figure 13E:
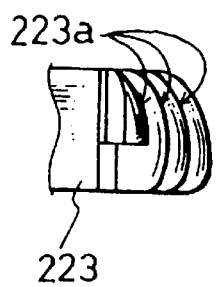
Figure 13F:
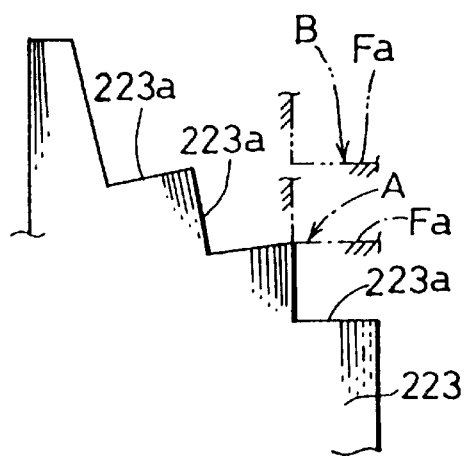

FIGS. 13(a) to 13(f) show the retaining leg 220 depending from the buckle 250. FIG. 13(a) Is a partly broken-away front view, FIG. 13(b) is a bottom view, FIG. 13(c) is a right side view, FIG. 13(d) is an enlarged-scale view showing an engagement step section, FIG. 13(d) is a plan view showing the engagement step section shown in FIG. 13(d), and FIG. 13(f) is a view for describing the engagement step section. As shown in FIGS. 13(a) to 13(c), the retaining leg 220 comprises a base 221 having a substantially oval shape in plan view, a pillar 222 depending from the base 221, and a pair of flexible retaining pieces 223 extending from the free end of the pillar 222 in a folded fashion toward the base 221. The base 221 has a substantially dish-like stabilizer 224 formed on the bottom thereof.

Figure 14A:
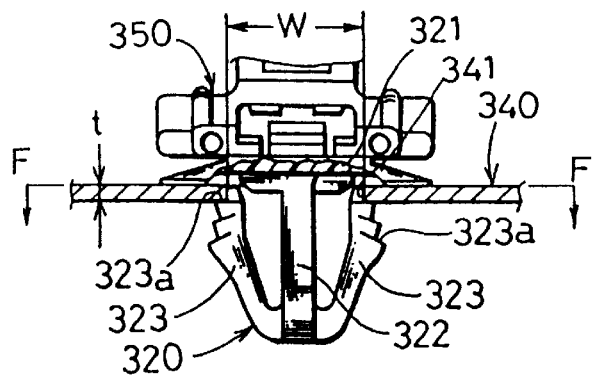
FIGS. 14(a) to 14(d) are views showing the same retaining leg in an attached state.
Figure 14B:
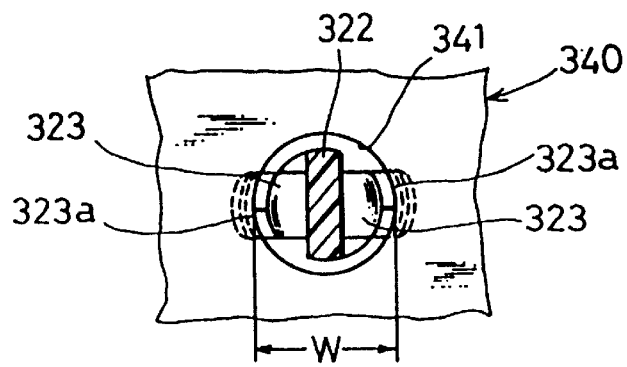
Figures 14C, 14D:
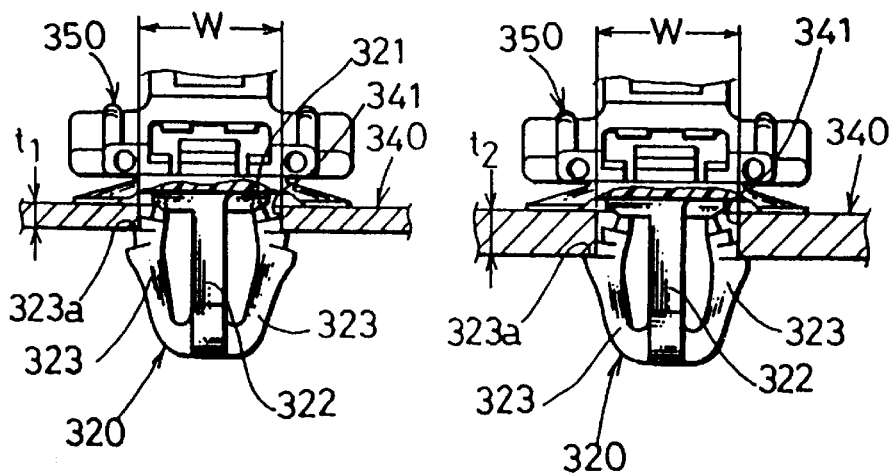

The free end of each of the retaining pieces 223 has an engagement step section 223a to engage a mounting hole 241 of a panel 240 which will be described later. As shown in FIGS. 13(d) and 13(e), each engagement step section 223a has a plurality of (three in the drawing) steps. The mounting hole 241 of the panel 240 is oval, as best shown in FIGS. 14(a) to 14(d) for describing the state of attachment of the retaining leg 220. FIG. 14(a) is a partly broken-away front view showing the state of engagement of the uppermost one of the steps of the engagement step section 223a, FIG. 14(b) is a sectional view taken along line F—F in FIG. 14(a), FIG. 14(c) is a partly broken-away front view showing the state of engagement of the intermediate step of the engagement step section 223a, and FIG. 14(d) is a partly broken-away front view showing the state of engagement of the lowermost step of the engagement step section 223a.

Referring to FIGS. 14(a) to 14(d), in the third embodiment, the engagement step sections 223a engage arcuate portions of the mounting hole 241 of the panel 240 extending at right angles to the longitudinal direction of the mounting hole 241. The engagement step sections 223a are arcuate in the width direction of the retaining pieces 223.

As with the second embodiment, the angle θ between each step or engagement face Fa of the engagement step section 223a that substantially faces the outer surface of the panel 240 and the associated engagement face Fb that substantially faces the inner edge surface of the mounting hole 241 of the panel 240, is set substantially to 90°, as shown in FIG. 13(d).

As shown in FIGS. 13(c) and 13(e), the retaining pieces 223 each have their end portion partly cut away lest they should interfere with a pertinent portion (shown at 220a) of the retaining leg 220 when they are flexed.

As shown in FIGS. 14(a) to 14(b), the engagement faces Fa of each engagement step section 223a are formed such that, when the engagement step section is disposed within a mounting hole 241 having a fixed width W, the engagement face Fa that contacts the panel 240 will be parallel to the outer surface of the panel 240, regardless of whether the panel 240 has a thickness of t, $t_1$ or $t_2$. More specifically, in this embodiment, as shown in FIG. 13(f), assuming the position of engagement of the lowermost step of the engagement step section 223a to be as shown by solid line, the position of engagement of the intermediate step of the engagement step section 223a is as shown by a single dot broken line (labeled A), and the position of engagement of the uppermost step of the engagement step section 223a is as shown by a double dot broken line (labeled B). In this way, the inclination of the retaining pieces 223 changes depending upon the step that is engaging the panel 240. From the consideration of the inclinations of the retaining pieces 223 in the states of engagement of the individual steps, each engagement face Fa of each engagement step section 223a is formed such that it is parallel to the outer surface of the panel 240 having a thicknesses t (see FIGS. 14(a) and 14(b)), $t_1$ (see FIG. 14(c)), or $t_2$ (see FIG. 4(d)), when the engagement step section 223a is in mounting hole 241 having a fixed width W.

A case of binding an object (for instance, a wire harness) with the above belt clamp will now be described. As shown by double dot broken lines in FIGS. 11(a) and 11(b), the buckle 250 is held to face an object 230 to be bound. Then, the belt 210 is wound around the object 230, and the end portion of the belt 210 is inserted through the through hole 254 so that it projects rearwardly of the buckle 250. Then, the object 230 is tightly bound by pulling the end portion of the belt 210 with fingers. By so doing, the engagement teeth 211 of the belt 210 are caused to clear the engagement protuberances 256 as a result of elastic deformation of the engagement piece 255. When the tightening is completed, the engagement protuberances 256 engage corresponding engagement teeth 211, thus completing the binding of the object 230 (see double dot broken lines in FIG. 12(a)). While the object 230 is tightly bound, the anti-slip protuberances 213 provide a function of stopping finger slippage. When it becomes necessary to release the object 230, the engagement between the engagement protuberances 256 and the engagement teeth 211 is released by operating the engagement release piece 257. By so doing, it is possible to loosen the belt 210 or take the belt 210 through the through hole 254.

Thereafter, the retaining leg 220 is inserted through the mounting hole 241 of the panel 240. As the retaining leg 220 is inserted through the mounting hole 241, the retaining pieces 223 are caused to flex inwardly by the mounting hole 241. When the base 221 comes to engage the panel 240, the retaining pieces 223 are elastically restored so that the step in each engagement step section 223a that corresponds to the thickness t, $t_1$ or $t_2$ of the panel 240 engages the mounting hole 241, so that the retaining leg 220 is attached and retained against detachment (see FIGS. 14(a) to 14(d)). With the retaining leg 220 attached in position in the mounting hole 241, the object 230 is bound and clamped to the panel 240. The stabilizer 224 elastically engages the surface of the panel 240.

Thus, the retaining leg 220 can be adequately attached to the panel 240 irrespective of the thickness thereof because the step in the engagement step section 223a that corresponds to the panel thickness t, $t_1$ or $t_2$ engages the mounting hole 241. That is, it is possible to eliminate rattling or the inability to attach the retaining leg 220. In addition, a single kind of retaining leg 220 can be adequately attached to a plurality of panels 240 having different thicknesses, and time-consuming component management is unnecessary.

As a further advantage, like the second embodiment, since with the retaining leg 220, the angle θ between the engagement faces Fa and Fb of the engagement step section 223a is substantially set to 90°, it is possible to provide an increased contact area of the engagement face Fa of the engagement step section 223 with respect to the panel 240, thus permitting an increased retaining force of the retaining leg 220 with respect to the panel 240.

As a still further advantage of the retaining leg 220, like the second embodiment, when each engagement step section 223a engages the mounting hole 241 of the panel 240 having a thickness t, $t_1$ or $t_2$, the prevailing engagement face Fa of the engagement step section 223a is parallel to the outer surface of the panel, and thus the engagement face Fa of the engagement step section 223a properly engages the panel 240.

Fourth Embodiment

A fourth embodiment will now be described with reference to FIGS. 15(a) to 15(c). The fourth embodiment is a modification of part of the third embodiment, and parts having substantially the same construction as those in the third embodiment are designated by like reference numerals, increased by 100 and are described only briefly, while the modified portions are described in detail.

Figures 16A, 16B:
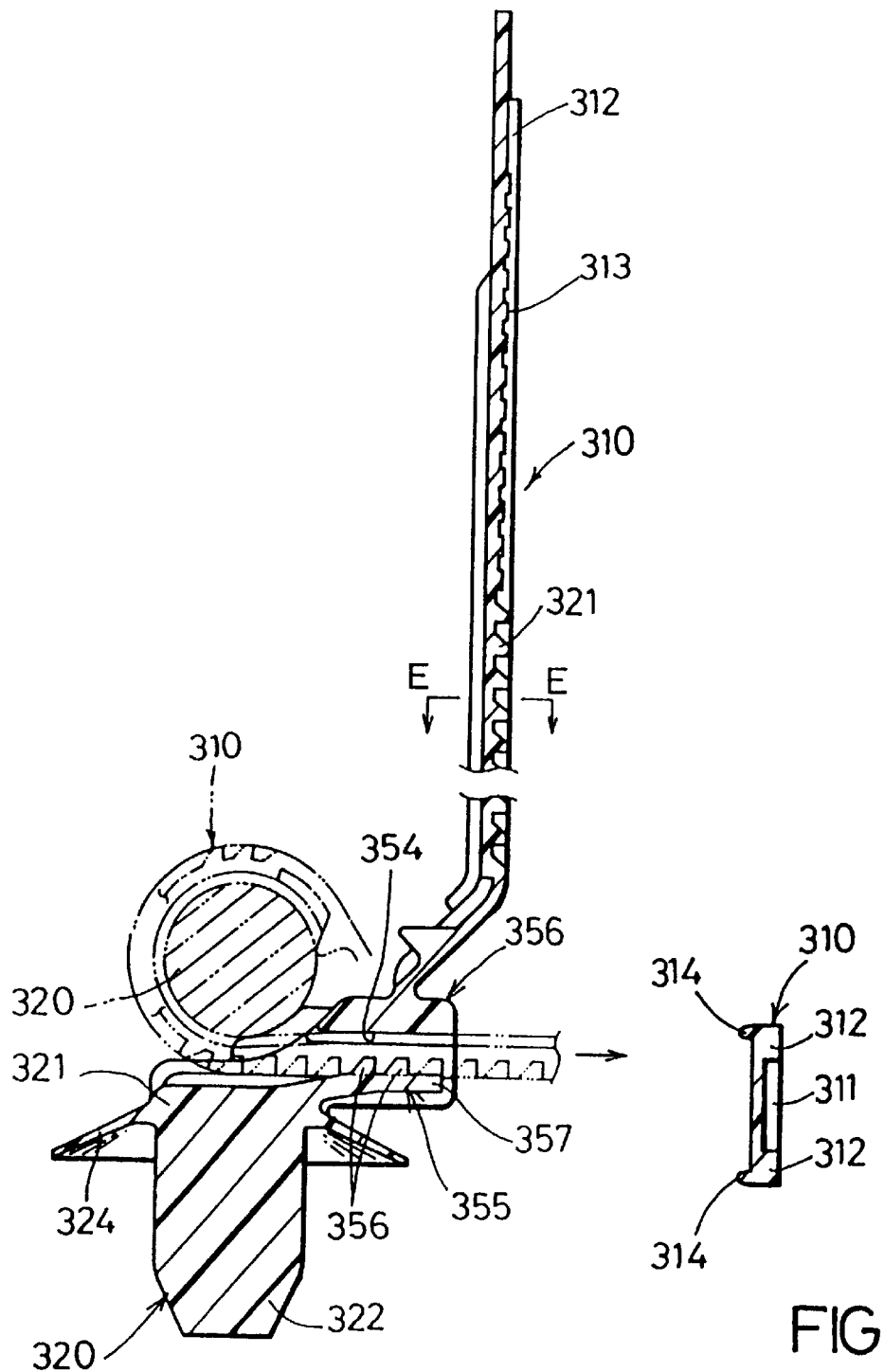
FIGS. 16(a) and 16(b) are sectional views showing the same belt clamp.

FIGS. 15(a) to 15(c) show a belt clamp. FIG. 15(a) is a front view, FIG. 15(b) is a partly broken-apart right side view, and FIG. 15(c) is a plan view. FIG. 16(a) is a sectional view showing the belt clamp, and FIG. 16(b) is a sectional view taken along line E—E in FIG. 16(a).

As shown in FIGS. 15(a) to 16(b), the belt clamp in this embodiment, like the third embodiment, mainly comprises a belt 310, a buckle 350 and a retaining leg 320.

The outer surface (i.e., back surface in the drawing) of the belt 310 has engagement teeth 311 and also ribs 312 formed on the opposite sides of the engagement teeth 311. The inner surface (i.e., front in the drawing) of the belt 310 has ribs 314 formed along the opposite edges. An end portion of the belt 310 has anti-slip protuberances 313.

As shown in FIG. 16(a), the buckle 350 to which the belt 310 is joined has a through hole 354 through which the belt 310 is inserted. An engagement piece 355 having two engagement protuberances 356 extends from the lower wall surface of the through hole 354. With elastic deformation of the engagement piece 355, the engagement protuberances 356 allow passage of the engagement teeth 311 when tightening the belt 310, but they block passage of the engagement teeth 311 in the reverse direction. The engagement piece 355 has an engagement release piece 357 at the free end thereof.

FIGS. 17(a) to 17(f) show the retaining leg 320 joined to the buckle 350. FIG. 17(a) is a partly broken-apart sectional view, FIG. 17(c) is a right side view, FIG. 17(d) is an enlarged-scale view showing an engagement step section, FIG. 17(e) is a view of a top view of the engagement step section, FIG. 17(f) is a sectional view taken along line G—G in FIG. 17(a). As shown in FIGS. 17(a) to 17(c), the retaining leg 320 comprises a base 321 having a substantially circular shape in plan view, a pillar 322 depending from the base 321, and a pair of flexible retaining pieces 323 extending from the free end of the pillar 322 in a folded fashion toward the base 321. The base 321 has a substantially dish-like stabilizer 324 formed at the bottom thereof. The retaining leg 320 in this embodiment is attached in position in a truly circular mounting hole 341 of a panel 340 which will be described later.

Figure 18A:
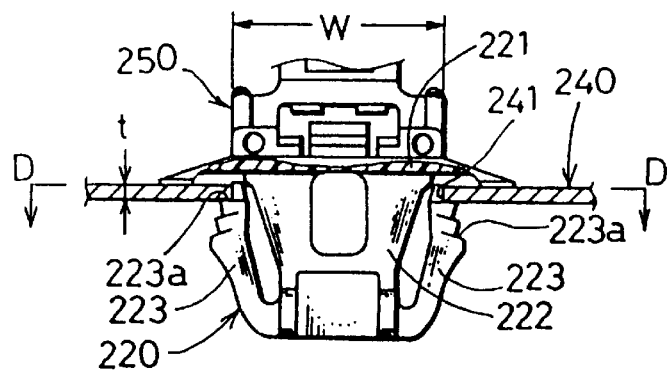
FIGS. 18(a) to 18(d) are views showing the same retaining leg in an attached state.

As shown in FIGS. 17(d) and 17(e), the free end of each of the retaining pieces 323 has an engagement step section 323a having a plurality of (three in the drawing) steps. As best shown in FIG. 18 for describing the state of attachment of the retaining leg 320, the panel 340 for attaching the retaining leg 320 thereto has the truly circular mounting hole 341. FIG. 18(a) is a partly broken-away sectional view showing a state of engagement of the uppermost step of the engagement step section 323a, FIG. 18(b) is a sectional view taken along line D—D in FIG. 18(a), FIG. 18(c) is a partly broken-away sectional view showing a state of engagement of the intermediate step of the engagement step section 323a, and FIG. 18(d) is a partly broken-away front view showing a state of engagement of the lowermost step of the engagement step section 323a.

Figure 18B:
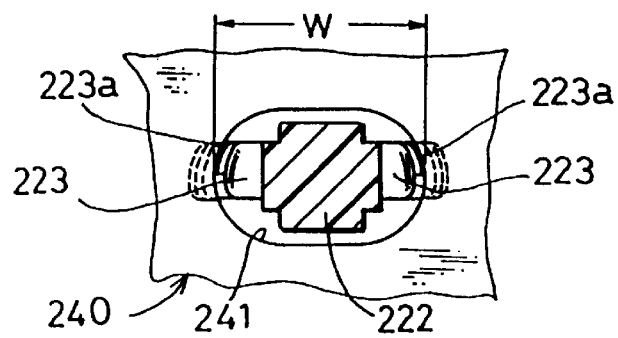
Figures 18C, 18D:
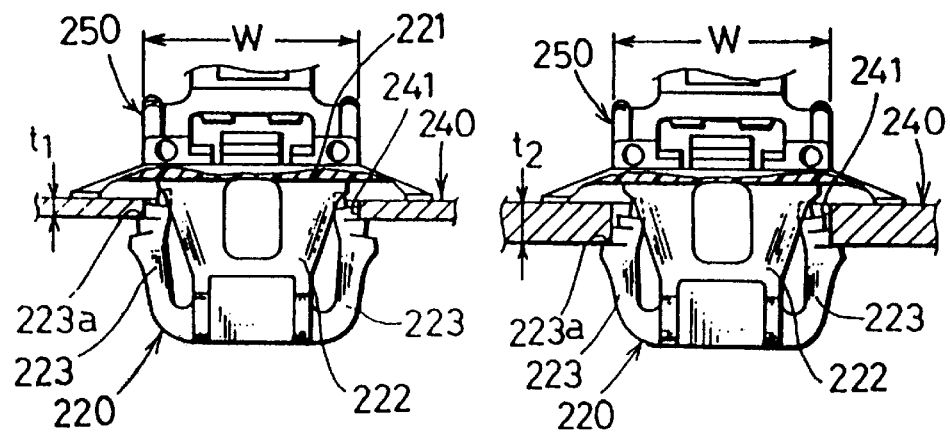
Figure 19:
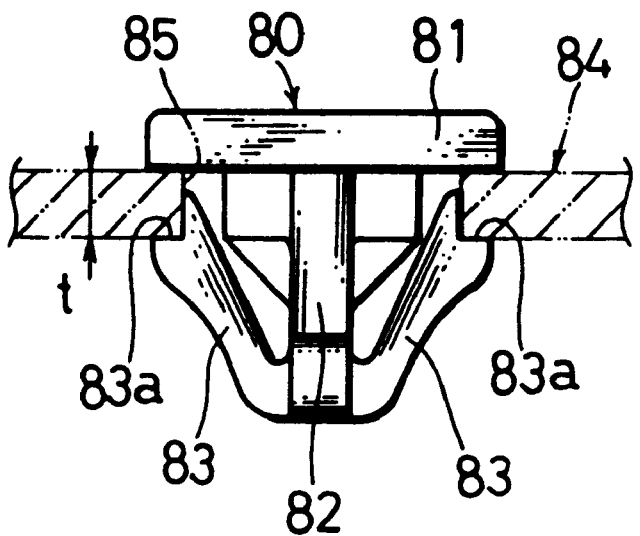
FIG. 19 is a view showing a prior art retaining leg.

Referring to FIGS. 18(a) to 18(c), in the fourth embodiment, the engagement step sections 323a engage arcuate portions of the truly circular mounting hole 341 of the panel 340, and they are arcuate in the width direction of the retaining pieces 323.

As shown in FIG. 17(d), the angle θ between the engagement faces Fa and Fb of each engagement step section 323a is substantially 90°, like the third embodiment.

As shown in FIGS. 17(c) and 17(e), the retaining pieces 323 each have their end portion partly cut away lest they should interfere with a pertinent portion (shown at 320a) of the retaining leg 320.

As shown in FIGS. 18(a) to 18(d), each engagement face Fa of each engagement step section 323a, like the third embodiment, is formed such that it is parallel to the outer surface of the panel 340 having a thickness t (see FIGS. 18(a) and 18(b)), $t_1$ (see FIG. 18(c)) or $t_2$ (see FIG. 18(d)), when the engagement step section 323a is in engagement with the mounting hole 341 of a fixed width W.

A case of binding an object (for instance, a wire harness) with the above belt clamp will now be described. As shown by double dot broken lines in FIGS. 15(a) and 15(b), the buckle 350 is held to face an object 330. Then, the belt 310 is wound around the object 330, and the end portion of the belt 310 is inserted through the through hole 354 so that it projects rearwardly of the buckle 350. Then, the end portion of the belt 310 is tightly bound by pulling the end portion of the belt 310 with fingers (see double dot broken lines in FIG. 16(a)).

Thereafter, the retaining leg 320 is inserted through the mounting hole 341 of the panel 340. As the retaining leg 320 is inserted through the mounting hole 341, the retaining pieces 323 are caused to flex inwardly by the mounting hole 341. When the base 321 contacts the panel 340, the retaining pieces 323 are elastically restored such that a step in each engagement step section 323a that corresponds to the thickness t, $t_1$ or $t_2$ of the panel 340 engages the mounting hole 341, so that the retaining leg 320 is attached and retained against detachment (see FIGS. 18(a) to 18(d)).

With the retaining leg 320 of the fourth embodiment, it is possible to obtain substantially the same effects as can be obtained with the retaining leg 220 of the third embodiment.

The embodiments described above are by no means limitative, and changes and modifications may be made without departing from the scope of the invention. For example, the retaining legs 20, 120, 220 and 320 of the first to fourth embodiments may be integral with the clamp, clip or like or like associated component, or they may be fabricated separately and then made integral with the associated component.

Moreover, the component retaining leg according to the invention can be adequately attached to a panel such that a step in each engagement step section that corresponds to the thickness of the panel engages the mounting hole. That is, a single retaining leg can be attached to any of a plurality of panels having different thicknesses, and time-consuming component management can be made unnecessary.

What is claimed:

1. An apparatus comprising:
 a base having an elastic stabilizer;
 a pillar projecting from the base, comprising a terminal end opposite from the base, and
 at least one flexible retaining leg extending from the terminal end back towards the base at an angle to a center axis of the pillar, the retaining leg comprising at least two engagement steps, each having a first engaging face and a second engaging face, the second engaging faces being disposed along the retaining leg such that when the apparatus is in a free state the second engaging faces are sequentially at increasing angles in relation to the central axis of the pillar, wherein each second engaging face sequentially achieves a substantially orthogonal relation to the central axis of the pillar as the retaining leg is compressed inward towards the pillar.

2. An apparatus as in claim 1, wherein the base further comprises means for attaching a component to the panel.

3. An apparatus as in claim 2, wherein the apparatus comprises two flexible retaining legs.

4. An apparatus as in claim 3, wherein the first engaging face and the second engaging face of each engagement step are set at a substantially 90° relationship to each other.

5. An apparatus as in claim 4, wherein the first engaging face and the second engaging face are set at an angle of between 90° and 98°.

6. An apparatus as in claim 4, wherein the second engaging face for at least one engagement step is adapted to contact a bottom surface of the panel in a substantially parallel relationship, wherein the apparatus adapts to variations of panel thickness by engaging the engagement step that most closely corresponds to the thickness of the panel.

7. An apparatus as in claim 6, wherein the base is substantially oval and the elastic stabilizer is a dish-like stabilizer.

8. An apparatus as in claim 4, wherein the first engaging face for at least one engagement step is adapted to contact a side surface of the panel opening in a substantially parallel relationship, wherein the apparatus adapts to variations of panel thickness by engaging the engagement step that most closely corresponds to the thickness of the panel.

9. An apparatus as in claim 1, engaging means has a first engagement step, a second further comprising a third engagement step, wherein the engagement steps are arranged such that the first engagement step is adapted to contact a bottom surface of the panel for panels having substantially a first thickness, wherein the second engagement step is adapted to contact the bottom surface of the panel for panels having substantially a second thickness and wherein the third engagement step is adapted to contact the bottom surface of the panel for panels having substantially a third thickness.

10. An apparatus as in claim 9, wherein each panel contact is substantially parallel.

11. An apparatus, comprising:
a base,
an elastic stabilizer that is adapted to contact a top surface of a panel,
a pillar projecting from the base comprising:
a terminal end opposite from the base, and
at least one flexible retaining leg extending from the terminal end back towards the base at an angle to a central axis of the pillar, the retaining leg comprising means for securely engaging the panel and having:
at least two engagement steps, each having a first engaging face and a second engaging face, the second engaging faces being disposed along the engaging means such that when the apparatus is in a free state the second engaging faces are sequentially at increasing angles in relation to the central axis of the pillar;
wherein each second engaging face sequentially achieves a substantially orthogonal relation to the central axis of the pillar as the retaining leg is compressed inward towards the pillar.

12. An apparatus as in claim 11, wherein the second engaging face for the appropriate engagement step is adapted to contact a bottom surface of the panel in a substantially parallel relationship, wherein the engaging means adapts to variations of panel thickness by engaging the engaging face that most securely engages the panel.

13. In combination:
a base assembly of predetermined width;
a pillar projecting from the base assembly and extending to a terminal end remote from the base assembly, a pair of flexibly resilient retaining legs engaged with and extending from the terminal end back towards the base assembly and at an angle to a center axis of the pillar, said legs terminating at outer ends laterally outward of said pillar, said legs being selectively inwardly compressible toward said pillar;
each of said retaining legs comprising means for securely engaging openings in panels having variations in thickness, the engaging means comprising at least two engagement steps, each engagement step having a first engaging face and a second engaging face, the second engaging faces being disposed along the retaining leg such that, prior to inward compression of said legs, the second engaging faces are sequentially at increasing angles in relation to the central axis of the pillar, wherein each second engaging face sequentially achieves a substantially orthogonal relation to the central axis of the pillar as the retaining lea is compressed inward towards the pillar.

14. A combination as in claim 13, wherein the base assembly further comprises means for attaching a component to the panel, wherein the first engaging face and the second engaging face of each engagement step are set at an angle of between 90° and 98° and wherein the second engaging face for at least one engagement step is adapted to contact a bottom surface of the panel in a substantially parallel relationship, such that the combination adapts to variations of panel thickness by engaging the engagement step that most closely corresponds to the thickness of the panel.

15. A combination as in claim 14, further comprising a third engagement step, wherein the engagement steps are arranged along the engaging means such that the first engagement step is adapted to contact a bottom surface of the panel for panels having substantially a first thickness, wherein the second engagement step is adapted to contact the bottom surface of the panel for panels having substantially a second thickness and wherein the third engagement step is adapted to contact the bottom surface of the panel for panels having substantially a third thickness.

16. A combination as in claim 13, wherein the base assembly further comprises means for attaching a component to the panel, wherein the first engaging face and the second engaging face of each engagement step are set at an angle of between 90° and 98° and wherein the first engaging face for at least one engagement step is adapted to contact a side surface of the panel in a substantially parallel relationship, such that the combination adapts to variations of panel thickness by engaging the engagement step that most closely corresponds to the thickness of the panel.

17. A combination as in claim 16, further comprising a third engagement step, wherein the engagement steps are arranged along the engaging means such that the first engagement step is adapted to contact a bottom surface of the panel for panels having substantially a first thickness, wherein the second engagement step is adapted to contact the bottom surface of the panel for panels having substantially a second thickness and wherein the third engagement step is adapted to contact the bottom surface of the panel for panels having substantially a third thickness.

18. A combination as in claim 13, wherein the base assembly is substantially oval and comprises is a dish-like elastic stabilizer.

19. A combination as in claim 13, further comprising a third engagement step, wherein the engagement steps are arranged along the engaging means such that the first engagement step is adapted to contact a bottom surface of the panel for panels having substantially a first thickness, wherein the second engagement step is adapted to contact the bottom surface of the panel for panels having substantially a second thickness and wherein the third engagement step is adapted to contact the bottom surface of the panel for panels having substantially a third thickness.

20. A combination as in claim 19, wherein each panel contact is substantially parallel.

* * * * *